No. 723,725. PATENTED MAR. 24, 1903.
O. C. PATTON.
SELF RECORDING WATER GAGE.
APPLICATION FILED MAY 19, 1902.
NO MODEL. 2 SHEETS—SHEET 1.

Witnesses
G. Sargent Elliott.
Joseph Wilkinson

Inventor:
Oliver C. Patton,
By H. S. Bailey Attorney.

No. 723,725. PATENTED MAR. 24, 1903.
O. C. PATTON.
SELF RECORDING WATER GAGE.
APPLICATION FILED MAY 19, 1902.
NO MODEL. 2 SHEETS—SHEET 2.
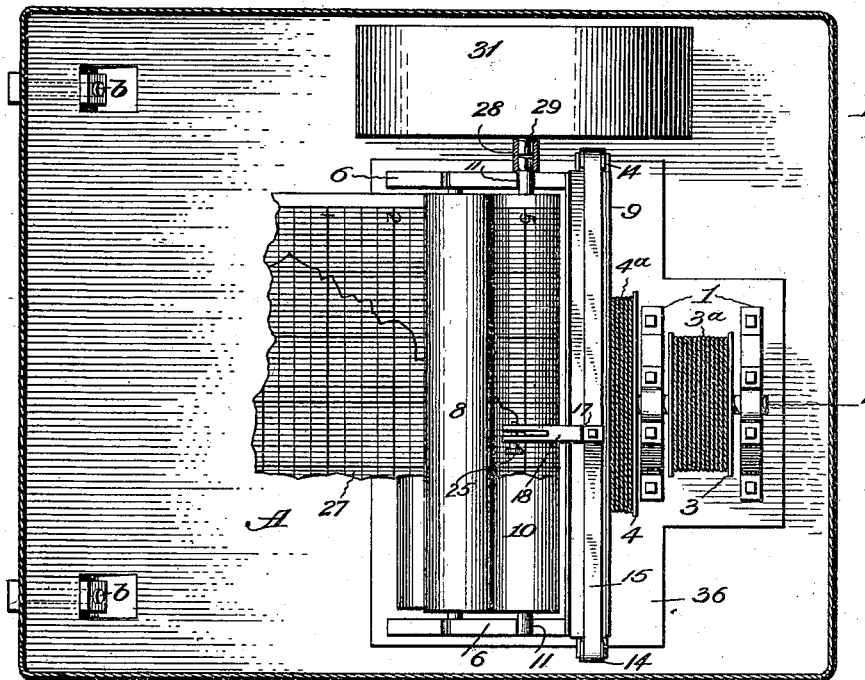
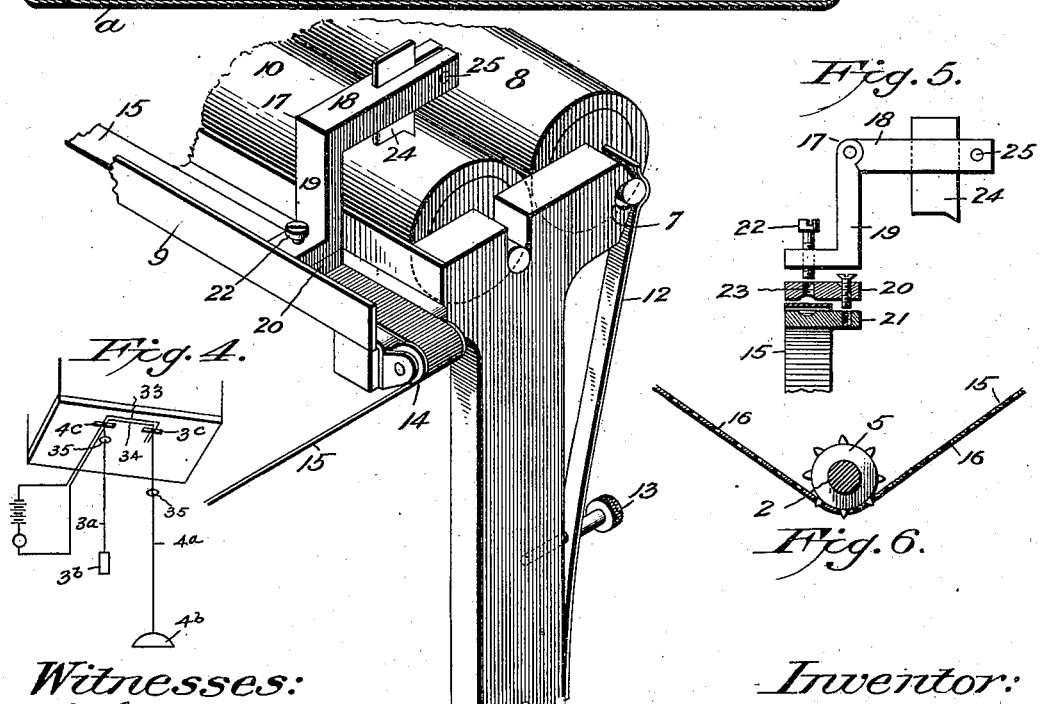
Witnesses:
G. Sargent Elliott
Joseph Wilkinson
Inventor:
Oliver C. Patton
By H. S. Bailey Attorney.

UNITED STATES PATENT OFFICE.

OLIVER C. PATTON, OF DENVER, COLORADO.

SELF-RECORDING WATER-GAGE.

SPECIFICATION forming part of Letters Patent No. 723,725, dated March 24, 1903.

Application filed May 19, 1902. Serial No. 108,074. (No model.)

*To all whom it may concern:*

Be it known that I, OLIVER C. PATTON, a citizen of the United States of America, residing at Denver, in the county of Arapahoe and State of Colorado, have invented certain new and useful Improvements in Self-Registering Water-Gages; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in self-registering water-gages for use in irrigation ditches and laterals, and is designed more especially as an improvement over a device of this general character for which a patent was granted to me on May 21, 1901, bearing Serial No. 674,634, the object of the present invention being to provide a machine which is adapted to be secured upon the top of a ditch-box, so that the rise and fall of water therein will operate a float which is directly or indirectly connected with the recording mechanism, a properly-arranged record-sheet being employed, upon which the record is automatically inscribed, and means independent of the recording mechanism for imparting an even continuous movement to the record-sheet under the recorder, whereby the exact depth of water in the ditch at every hour of the day will be accurately recorded.

The invention further consists in certain novel features of construction and combination of parts, which will be set forth in the accompanying specification and particularly pointed out in the claims.

Figure 1:
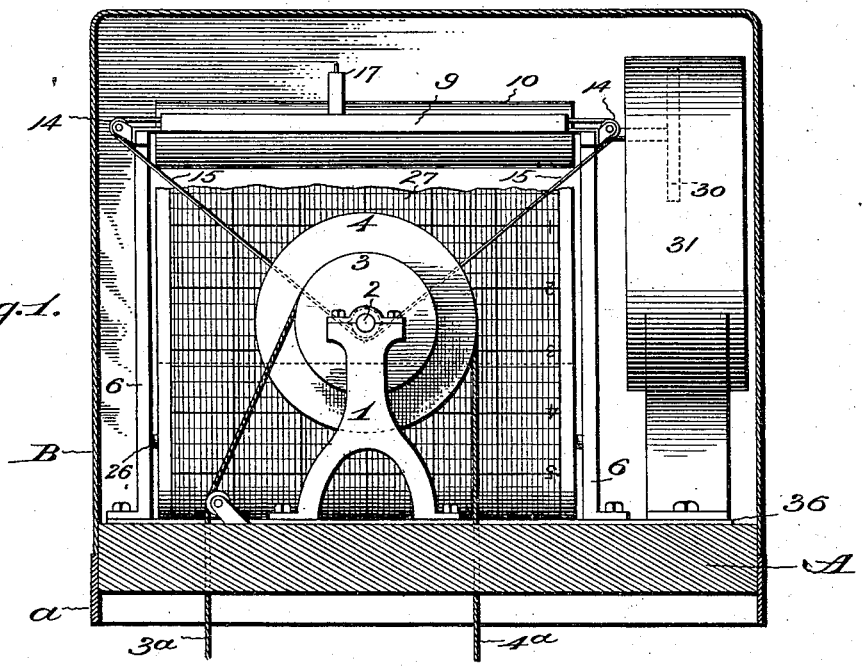
Figure 2:
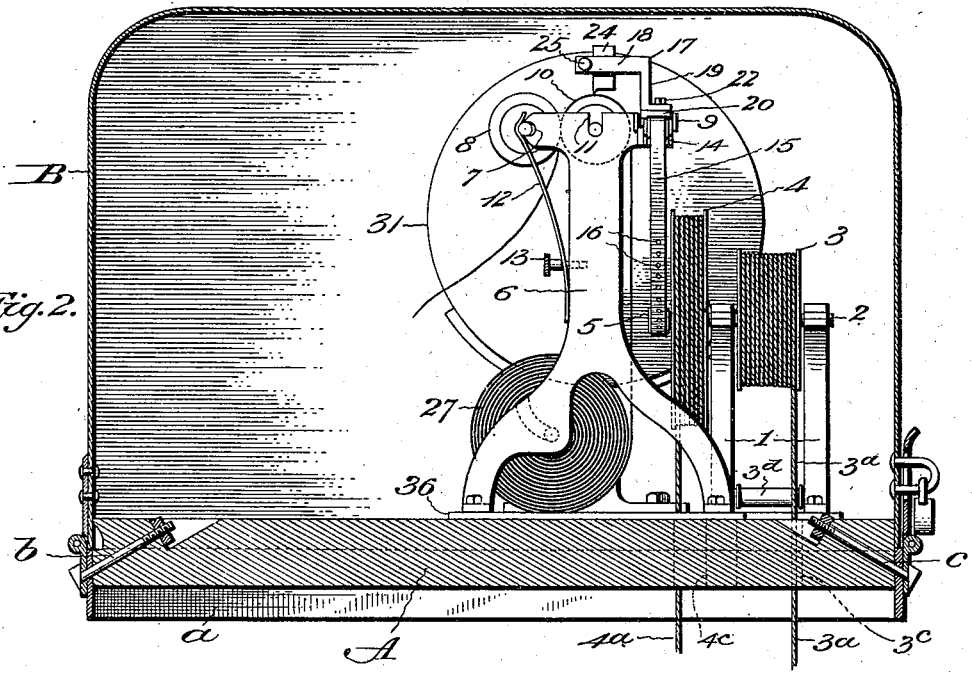

In the accompanying drawings, Figure 1 is a front view of my preferred form of water-recorder, the casing inclosing the same being shown in section. Fig. 2 is a side elevation of the same, the casing being shown in section and the manner of securing the said casing to the base-plates upon which the water-recorder is secured being clearly shown. Fig. 3 is a horizontal section through the casing, showing the mechanism in plan view. Fig. 4 is a detail perspective view showing the rolls which move the record-sheet and the penholder secured to an endless tape, a pen being shown clamped in position therein. Fig. 5 is a view illustrating the manner of clamping the penholder to the tape, the vertical and horizontal members of the penholder being connected by a hinge-joint. Fig. 6 is a view showing a portion of the endless tape and a toothed wheel which engages perforations in the said tape, so as to move the same.

Like letters and figures of reference indicate corresponding parts throughout the drawings.

Referring to the drawings, the letter A indicates the base-plate, upon which the mechanism constituting my improved water-gage is secured. This base-plate is rectangular in form, and around its edges is secured a metal frame $a$, which extends a suitable distance below the bottom of the base-plate, the said base-plate extending about half its thickness above the top edge of the frame, and a casing B, which incloses the gage mechanism, surrounds the base-plate, so as to rest upon the frame $a$, to which it is hinged. One leaf of each hinge is secured to the frame $a$ and to the base-plate by a bolt $b$, which passes diagonally through the leaf-frame and base-plate and receives a nut upon its inner end, while the other leaf is riveted to the casing. On the opposite side the casing is provided with a staple, upon which a hasp is locked, the member to which the hasp is hinged being secured to the frame $a$ and base-plate by a bolt $c$, which is identical with bolts $b$ on the opposite side of the casing. It will be observed that the heads of these bolts being on the outside, while their securing-nuts are on the inside, of the casing makes it impossible for any unauthorized person to gain access to the interior of the casing after the same has been locked. The portion of the frame $a$ which extends below the base-plate is adapted to fit around the top of a ditch-box, to which it is securely attached. Near the front side of the base-plate and about centrally of its width is secured a pair of standards 1, in which revolves a horizontal shaft 2, upon which is keyed a pair of drums 3 and 4 and at its inner end a spur-wheel 5. Around the drum 3 is wound a cord $3^a$, to the free end of which a weight $3^b$ is secured. The drum 4 has about twice the circumference of the drum 3, and around it is wound a cord $4^a$, but in the opposite direction to the wind of the cord on drum 3, and at its free end the cord 4ª carries a float 4ᵇ. As the cords are oppositely wound, it will be observed that as one is wound around its drum the other will be uncovered, and vice versa. The weight-cord 3ª passes down through a slot 3ᶜ in the base-plate and into the ditch-box. A roller 3ᵈ, secured adjacent to the slat 3ᶜ, prevents the cord contacting with the side of the slot. The float-cord 4ª passes down through a slot 4ᶜ in the base-plate and into the ditch-box, and the two cords are a sufficient distance apart to prevent the weight and float from striking against each other. The weight-drum is of less circumference than the float-drum, as it is not necessary that the weight should have to travel the same distance as the float. Rear of the standards 1 is located a pair of standards 6, which are positioned at right angles to the standards 1. Each of these standards is T-shaped or has lateral extensions at its upper end, as shown, and in the rear extension of each standard is formed a horizontal open-ended bearing 7, in which revolves the shaft of a rubber-faced roller 8, which extends from one standard to the other, while the forward extensions support a trough or guideway 9, which extends from one standard to the other. Between the trough 9 and roller 8 is located another rubber-faced roller 10, the shaft of which revolves in bearings 11 in the top of the standards. The roller 8 is held in its bearing and in contact with roller 10 by a pair of springs 12 and each of which bears against one end of the shaft extending through said roller. The lower end of each of these springs is apertured, and through the aperture passes a thumb-screw 13, which enters a threaded opening in the vertical member of the standard. A shoulder on each screw bears against the spring, and by properly regulating the screw the required pressure on the roller-shaft may be secured. At each end of the guideway 9 is located a roller 14, and over these rollers and through the guideway passes an endless tape 15, which extends down and around the spur-wheel 5 on the inner end of the shaft 2. This tape is provided with equidistant perforations 16, which extend over an area equal to the length of the rollers 8 and 10, and the spurs on wheel 5 engage these perforations as shaft 2 revolves, and thus move the tape through guideway 9, as will be understood. Clamped upon that portion of the tape which moves through the guideway is a penholder 17, which moves back and forth in the said guideway and over the roller 10 as the tape is moved by spur-wheel 5, and this penholder is formed to present a horizontally-disposed arm 18, which lies above the roller 10, a vertically-depending member 19, which is formed with a short right-angular portion at its extremity. The tape is clamped between a pair of blocks 20 and 21, and the lower end of the penholder is secured by a screw 22 to the upper block 20, the screw passing through a threaded aperture 23 in the said block and contacting with the tape. The arm 18 of the penholder is slotted vertically from its free end a suitable distance, and in this slot is clamped a fountain-pen 24 of a preferred design by a thumb-screw 25.

Journaled in the lower ends of standards 6 is a shaft 26, upon which is wound a suitably-ruled record-sheet 27, the free end of which is carried up and over roller 10 and thence down between rollers 10 and 8. This sheet is ruled by heavy lines lengthwise and crosswise, so as to form spaces one inch square. These squares are again divided lengthwise of the sheet by fine lines into twelve divisions each and crosswise of the sheet into four divisions each. Read in the direction of the movement of the pen these squares indicate feet and fractions thereof, and when read in direction of the movement of the paper they indicate hours and fractions thereof. The shaft of roller 10 extends slightly beyond one of its bearings, and this extension is squared and enters one end of a union 28. The other end of the union receives the square end of a stub-shaft 29, which carries a gear-wheel 30 at its opposite end. This wheel is suitably geared to the hour-arbor of an ordinary clock mechanism carried by a casing 31, so that each hour the shaft 29, carrying roller 10, will revolve sufficiently to move the record-sheet forward one inch or the length of one of the large squares. The machine, as illustrated in the drawings, is arranged to measure a depth of six feet of water, and when thus arranged the spur-wheel 5 has one-twelfth the circumference of the float-drum 4, and the large squares on the record-sheet are one inch, making six squares to the width of the paper. When it is desired to record a depth of twelve feet, a spur-wheel 5 is employed, having a circumference one twenty-fourth that of the float-drum. The record-sheet is divided into squares one-half of one inch each way, and the wheel 30 is so geared to the hour-arbor of the clock mechanism that the record-sheet will be moved one-half inch per hour instead of one inch. In this way a saving of one-half of the record-paper is effected and a depth of from zero to twelve feet may be recorded. Should it be desired to remove the clock for repairs or for any other purpose, it can be easily done by slipping the squared end of stub-shaft 29 out of the union 28, thus obviating the necessity of removing roller 10.

In Fig. 5 a slight modification of the penholder is shown, in which the horizontal area 18 is hinged to the vertical member 19, thus permitting an automatic adjustment of the pen upon the record-sheet.

In connection with the machine I employ a device for sounding an alarm when the water in the ditch reaches either its highest or lowest depth, which is as follows: On the under side of the base-plate and adjacent to the slots through which the weight and float-cords pass I secure the terminals of a ground and line wire 33 and 34, respectively, and on both the float and weight cords at a proper distance from their extremities a contact plate or button 35 is secured. Now when the float reaches the lowest point in ditch-box the contact-button on the weight-cord will contact with the wires 33 and 34, close the electric circuit, and cause a bell to ring, which will give notice that there is no water in the ditch. On the other hand, when the float rises to the highest point the button on the cord to which it is attached will contact with the aforesaid circuit-wires, close the circuit, and give notice that the water in the ditch has reached the highest point.

The operation of the herein-described device is as follows: The casing is secured upon the top of a ditch-box. The clock, preferably an eight-day clock, is wound, and the record-sheet is moved until the figure indicating the hours at which the machine is set lies on the upper side of roller 10 or in line with the pen. The float is then lowered to the position indicating the lowest depth of water, which action turns the spur-wheel 5, which moves the tape 15 and positions the penholder and its pen either to the right or left end of roller 10, according to the direction in which the said float-cord is wound around its drum 4. The casing is then locked and the machine is secured against unauthorized attempts to tamper with the same. As the water rises in the ditch-box the float will be borne up and the weight will descend, turning drums 3 and 4 and spur-wheel 5. If the float-drum has a circumference of twelve inches, the spur-wheel will have just one-twelfth of that area or one inch. Therefore each revolution of the spur-wheel will carry the tape around the distance of an inch and the pen, which is clamped upon the tape, will move a like distance, indicating a depth of one foot of water for each inch of travel, the clock mechanism meanwhile moving the record-sheet forward an inch for each hour. The machine operates the same when geared to measure a depth of twelve feet of water, only the proportion between the circumferential area of float-drum and spur-wheel is one to twenty-four and the record-sheet is moved one-half an inch each hour.

Having fully described my invention, what I claim as new, and desire to secure by Letters Patent, is—

1. In a water-meter of the class described, a record-sheet which is moved in one direction, and means for accomplishing the movement thereof, at a predetermined and uniform speed; a pen arranged to move at right angles to the direction of movement of the said record-sheet, means for moving said pen, consisting of a shaft, a float and weight counterbalanced, and suspended therefrom, and adapted to oscillate said shaft, and a flexible band or tape positively connecting the pen and the shaft, and transmitting to the pen the relative movement of the float, in combination with an electric annunciator, indicating the extreme movements of the float, substantially as shown.

2. In a water-meter of the class described, a shaft, a pair of drums and a spur-wheel secured thereupon; a cord wound upon one of said drums having a float attached at its free end; a cord oppositely wound upon the other of said drums, and having a weight attached at its free end, so as to counterbalance the float; a record-sheet which is moved in one direction, and means for accomplishing the movement thereof at a predetermined and uniform speed; a pen arranged to move at right angles to the direction of movement of the said record-sheet; means for moving said pen, consisting of a flexible band or tape, having positive connection with the aforesaid spur-wheel; and contact-plates, carried by said float and weight cords, adapted to close an electric circuit, and sound an alarm, at the highest and lowest position of the float, substantially as shown.

3. In a device of the character described, the combination with a base-plate of standards secured thereto; a shaft mounted upon the standards carrying a pair of drums, and at one end a spur-wheel; cords or cables, one of which is wound around each drum, but in opposite directions to each other, one cord carrying a weight at its free end while the other cord carries a float; standards which support a pair of rollers; a record-sheet which passes over one of the said rollers and between it and the other roller, a guideway supported by the standards that support said rollers; a roller at each end of said guideway, an apertured band mounted on the roller at the ends of said guideway and on said spur-pinion and arranged to be driven by the teeth of said spur-gear meshing into the perforations of said band a pen operatively secured to said apertured band in operative working relation to said record-sheet-carrying roller and arranged to move back and forth over said record-sheet, and means connected with the drum-shaft, for imparting movement to the pen, and means, independent of the recording mechanism for moving the recording-sheet at a predetermined and uniform speed, substantially as shown.

4. The combination with a base-plate, of standards secured thereto; a shaft revolubly mounted upon the said standards; one end of which carries a spur-wheel; drums secured to the shaft, upon one of which is wound a cord or cable, which carries a float at its free end, while a similar cord or cable is oppositely wound upon the other drum, and carries a weight at its free end; standards which support a pair of rollers and a shaft around which a record-sheet is wound, the said sheet being arranged to pass upward over one of the rollers, and between it and the other roller; a pen arranged to move back and forth over the record-sheet, and a holder to which said pen is secured a flexible band connected with the penholder, and with the spur-wheel by which movement is imparted to the said penholder; means independent of the recording mechanism for moving the record-sheet at a predetermined and uniform speed, and means carried by the float and weight cords for contacting with the terminals of a pair of circuit-wires, so as to close the circuit and sound an alarm, substantially as shown.

5. The combination with a base-plate having slots therethrough, and a metallic frame around its sides, of a shaft supported in standards secured to said base-plate; drums secured upon the said shaft, and a spur-wheel secured to one end thereof; cords or cables, one of which is wound around one of the drums, while the other cord is oppositely wound around the other drum, one of the said cords carrying a weight, while the other one carries a float; a record-sheet, a roller, over which said record-sheet passes, and means for turning said roller so that the said sheet shall be moved at a predetermined and uniform speed; a spring-actuated roller, which holds the sheet in contact with the before-mentioned roller; a holder carrying a pen which is adapted to be moved back and forth over the said record-sheet; a flexible band or tape to which the penholder is clamped, the said band passing around the spur-wheel on the drum-shaft, and being moved thereby, as the shaft is revolved; and contact-buttons carried by the float and weight cords, which make and break an electric circuit so as to sound an alarm, substantially as shown.

6. In a water-meter of the class described, a shaft, a pair of drums and a spur-wheel, secured thereupon; a cord wound upon one of said drums having a float attached at its free end; a cord oppositely wound upon the other of said drums, and having a weight attached at its free end, so as to counterbalance the float; a record-sheet which is moved in one direction, and means for accomplishing the movement thereof, at a predetermined and uniform speed; a roller over which said record-sheet passes, and means for holding the said sheet against the said roller; a pen arranged to move at right angles to the direction of movement of the said record-sheet; a suitable holder, and means for clamping the said pen thereto; means for moving said pen and holder, consisting of a flexible band or tape, having positive engagement with the aforesaid spur-wheel; a trough or guideway in which the said penholder moves; having a roller at each end over which the aforesaid flexible band passes; and contact-plates carried by the said float and weight cords adapted to close an electric circuit and sound an alarm at the highest and lowest position of the float, substantially as shown.

7. In a water-meter of the class described, the combination with a record-sheet and means for moving the same in one direction at a predetermined and uniform speed, of a pen, arranged to move at right angles to the direction of movement of the said record-sheet; means for moving said pen, including a shaft to which is secured a pair of drums and a spur-wheel, a flexible band or tape connecting the said pen and spur-wheel, and a float and weight secured to cords which are oppositely wound, one on one of said drums and one on the other, the movement of said float being thus transmitted to the said pen through the medium of the said spur-wheel and flexible band; and contact-plates, carried by the said float and weight cords adapted to close an electric circuit and sound an alarm at the highest and lowest position of the float, substantially as shown.

In testimony whereof I affix my signature in presence of two witnesses.

OLIVER C. PATTON.

Witnesses:
G. SARGENT ELLIOTT,
BESSIE THOMPSON.